(12) United States Patent
Schulte

(10) Patent No.: US 12,103,273 B2
(45) Date of Patent: Oct. 1, 2024

(54) FLOOR, WALL, OR CEILING PANEL AND METHOD FOR PRODUCING SAME

(71) Applicant: Välinge Innovation AB, Viken (SE)

(72) Inventor: Guido Schulte, Rüthen-Meiste (DE)

(73) Assignee: VÄLINGE INNOVATION AB, Viken (SE)

( * ) Notice: Subject to any disclaimer, the term of this patent is extended or adjusted under 35 U.S.C. 154(b) by 547 days.

(21) Appl. No.: 17/090,511

(22) Filed: Nov. 5, 2020

(65) Prior Publication Data

US 2021/0078305 A1 Mar. 18, 2021

Related U.S. Application Data

(60) Division of application No. 16/571,547, filed on Sep. 16, 2019, now Pat. No. 10,857,765, which is a (Continued)

(30) Foreign Application Priority Data

Nov. 27, 2013 (DE) ...................... 10 2013 113 125.5

(51) Int. Cl.
*B32B 21/04* (2006.01)
*B32B 21/13* (2006.01)
(Continued)

(52) U.S. Cl.
CPC ............ *B32B 21/042* (2013.01); *B32B 21/13* (2013.01); *B32B 21/14* (2013.01); *B32B 37/10* (2013.01);
(Continued)

(58) Field of Classification Search
CPC ....... B32B 21/042; B32B 21/13; B32B 21/14; B32B 2419/04; B32B 2255/08;
(Continued)

(56) References Cited

U.S. PATENT DOCUMENTS 2,018,712 A 10/1935 Elmendorf
2,303,982 A * 12/1942 Brookes ................. C09J 161/24
524/34

(Continued)

FOREIGN PATENT DOCUMENTS

AU 80284/75 6/1975
AU 2011236087 A1 10/2011
(Continued)

OTHER PUBLICATIONS

U.S. Appl. No. 17/202,836, Ziegler et al.
(Continued)

*Primary Examiner* — Catherine A. Simone
(74) *Attorney, Agent, or Firm* — Boone IP Law

(57) ABSTRACT

A floor, wall, or ceiling panel and to a method for producing same. The panel has a base made of a wood material and an upper veneer. The base and the veneer are hot-pressed together while incorporating a resin layer. During the pressing process, pores, cracks, and/or gaps in the veneer are filled with resin. In particular, the pressing process is carried out such that the veneer is saturated with resin, and the resin can be seen on the surface of the veneer after the pressing process. The adhesion of the veneer to the base and the smoothing of the veneer are thus carried out in one operation.

11 Claims, 1 Drawing Sheet

Related U.S. Application Data continuation of application No. 15/039,638, filed as application No. PCT/DE2014/100106 on Mar. 27, 2014, now Pat. No. 10,442,164.

(51) Int. Cl.

| | | |
|---|---|---|
| *B32B 21/14* | (2006.01) | |
| *B32B 37/10* | (2006.01) | |
| *B32B 37/12* | (2006.01) | |
| *B32B 38/06* | (2006.01) | |
| *E04B 9/04* | (2006.01) | |
| *E04F 13/10* | (2006.01) | |
| *E04F 15/04* | (2006.01) | |
| *B32B 37/06* | (2006.01) | |

(52) U.S. Cl.
CPC .............. *B32B 37/12* (2013.01); *B32B 38/06* (2013.01); *E04B 9/045* (2013.01); *E04F 13/10* (2013.01); *E04F 15/042* (2013.01); *E04F 15/045* (2013.01); *B32B 37/06* (2013.01); *B32B 37/1292* (2013.01); *B32B 2250/02* (2013.01); *B32B 2255/08* (2013.01); *B32B 2255/26* (2013.01); *B32B 2260/026* (2013.01); *B32B 2260/046* (2013.01); *B32B 2317/16* (2013.01); *B32B 2419/04* (2013.01); *Y10T 156/1062* (2015.01); *Y10T 156/1066* (2015.01); *Y10T 156/1075* (2015.01); *Y10T 156/1079* (2015.01)

(58) Field of Classification Search
CPC .. B32B 2260/026; E04F 13/10; E04F 15/042; E04F 15/045
See application file for complete search history.

(56) References Cited

U.S. PATENT DOCUMENTS

| | | |
|---|---|---|
| 2,419,614 A | 4/1947 | Welch |
| 2,587,064 A | 2/1952 | Rapson: |
| 2,630,395 A | 3/1953 | Mccullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,242,390 A * | 12/1980 | Nemeth ................ E04F 15/181 428/57 |
| 4,263,373 A | 4/1981 | McCaskey, Jr et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Schuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,811,489 B2 | 10/2010 | Pervan |
| 7,918,062 B2 | 4/2011 | Chen |
| 8,021,741 B2 | 9/2011 | Chen |

(56) References Cited

U.S. PATENT DOCUMENTS

| | | |
|---|---|---|
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 B2 | 5/2022 | Pervan et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |

(56) References Cited

U.S. PATENT DOCUMENTS

| | | |
|---|---|---|
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0101310 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |
| 2022/0176582 A1 | 6/2022 | Nilsson |

FOREIGN PATENT DOCUMENTS

| | | |
|---|---|---|
| CA | 2557096 A1 | 7/2005 |
| CA | 2852656 A1 | 4/2013 |
| CH | 298894 A | 5/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 202 14 532 U1 | 2/2004 |
| DE | 102 45 914 A1 | 4/2004 |
| DE | 103 00 247 A1 | 7/2004 |
| DE | 103 31 657 A1 | 2/2005 |
| DE | 202004003061 U1 | 7/2005 |
| DE | 102004050278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 234 220 A2 | 9/1987 |
| EP | 0 129 430 B1 | 1/1990 |
| EP | 0 355 829 A2 | 2/1990 |
| EP | 0 592 013 A2 | 4/1994 |
| EP | 0 611 408 A1 | 8/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 0 993 934 A2 | 4/2000 |
| EP | 1 035 255 A1 | 9/2000 |
| EP | 1 125 971 A1 | 8/2001 |
| EP | 1 136 251 A2 | 9/2001 |
| EP | 1193288 A1 | 4/2002 |
| EP | 1 209 199 A1 | 5/2002 |
| EP | 1 249 322 A1 | 10/2002 |
| EP | 1 262 607 A1 | 12/2002 |
| EP | 1388414 A1 | 2/2004 |
| EP | 1 454 763 A2 | 9/2004 |
| EP | 1 242 702 B1 | 11/2004 |
| EP | 1 498 241 A2 | 1/2005 |
| EP | 1 584 378 A1 | 10/2005 |
| EP | 1 657 055 A1 | 5/2006 |
| EP | 1 681 103 A2 | 7/2006 |

(56) References Cited

FOREIGN PATENT DOCUMENTS

| | | |
|---|---|---|
| EP | 1 690 603 A1 | 8/2006 |
| EP | 1507664 B1 | 7/2007 |
| EP | 1808311 A1 | 7/2007 |
| EP | 1 847 385 A1 | 10/2007 |
| EP | 1 961 556 A1 | 8/2008 |
| EP | 1985464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2213476 A1 | 8/2010 |
| EP | 2226201 A1 | 9/2010 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2415947 A2 | 2/2012 |
| EP | 2 263 867 B1 | 3/2012 |
| EP | 2 902 196 A1 | 8/2015 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | S51-128409 A | 11/1976 |
| JP | S52-087212 A | 7/1977 |
| JP | S53-148506 | 12/1978 |
| JP | S56-049259 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | H02-229002 A | 9/1990 |
| JP | H03-030905 A | 2/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | H11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | 93/24295 A1 | 12/1993 |
| WO | 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | 03/78761 A1 | 9/2003 |
| WO | 03/95202 A1 | 11/2003 |
| WO | 2004/042168 A1 | 5/2004 |
| WO | WO 2004/050359 A1 | 6/2004 |
| WO | WO 2004/067874 A2 | 8/2004 |
| WO | WO 2005/035209 A2 | 4/2005 |
| WO | WO 2005/054599 A1 | 6/2005 |
| WO | WO 2005/054600 A1 | 6/2005 |
| WO | WO 2005/066431 A2 | 7/2005 |
| WO | 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | 2006/015313 A2 | 2/2006 |
| WO | WO 2006/013469 A1 | 2/2006 |
| WO | WO 2006/042651 A1 | 4/2006 |
| WO | WO 2006/043893 A1 | 4/2006 |
| WO | 2006/066776 A2 | 6/2006 |
| WO | WO 2006/126930 A1 | 11/2006 |
| WO | 2007/015669 A2 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/148771 A1 | 12/2008 |
| WO | 2009/015682 A1 | 2/2009 |
| WO | 2009/050565 A1 | 4/2009 |
| WO | WO 2009/065768 A1 | 5/2009 |
| WO | WO 2009/065769 A2 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | 2010/084466 A2 | 7/2010 |
| WO | 2010/094500 A1 | 8/2010 |
| WO | WO 2010/087752 A1 | 8/2010 |
| WO | WO 2011/058233 A1 | 5/2011 |
| WO | 2011/087422 A1 | 7/2011 |
| WO | 2011/087423 A1 | 7/2011 |
| WO | 2011/087424 A1 | 7/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | 2012/076608 A1 | 6/2012 |
| WO | 2012/141647 A1 | 10/2012 |
| WO | 2012/154113 A1 | 11/2012 |
| WO | 2013/056745 A1 | 4/2013 |
| WO | WO 2013/079950 A1 | 6/2013 |
| WO | 2013/139460 A1 | 9/2013 |
| WO | WO 2013/167576 A2 | 11/2013 |
| WO | WO 2013/182191 A2 | 12/2013 |
| WO | WO 2014/017972 A1 | 1/2014 |
| WO | WO 2014/109699 A1 | 7/2014 |

(56) References Cited

FOREIGN PATENT DOCUMENTS

| WO | 2015/078443 A1 | 6/2015 |
|---|---|---|
| WO | 2015/078444 A1 | 6/2015 |
| WO | WO 2015/078434 A1 | 6/2015 |
| WO | 2015/106771 A1 | 7/2015 |
| WO | WO 2015/105455 A1 | 7/2015 |
| WO | WO 2015/105456 A1 | 7/2015 |
| WO | WO 2015/174909 A1 | 11/2015 |

OTHER PUBLICATIONS

U.S. Appl. No. 17/205,469, Ziegler et al.
Ziegler, Göran, et al., U.S. Appl. No. 17/202,836 entitled "Method to Produce a Veneered Element and a Veneered Element," filed Mar. 16, 2021.
Ziegler, Göran, et al., U.S. Appl. No. 17/205,469 entitled "Method of Producing a Veneered Element," filed Mar. 18, 2021.
Ziegler, Göran, et al., U.S. Appl. No. 17/697,417 entitled "Method to Produce a Building Panel and a Building Panel," filed Mar. 17, 2022.
Pervan, Darko, et al., U.S. Appl. No. 17/711,487 entitled "Wood Fibre Based Panel with a Surface Layer," filed Apr. 1, 2022.
Rittinge, Rickard, et al., U.S. Appl. No. 17/769,594 entitled "Wood Fibre Based Panel and a Method for Obtaining Such Panel," filed Apr. 15, 2022.
Ziegler, Göran, et al., U.S. Appl. No. 17/747,325 entitled "Method of Producing a Veneered Element," filed May 18, 2022.
Communication Under Article 94(3), mailed Nov. 13, 2020 in EP 14 718 504.5, European Patent Office, Rijswijk, NL, 4 pages.
Schulte, Guido, U.S. Appl. No. 17/352,942 entitled "Method for Producing a Floorboard," filed Jun. 21, 2021.
Nilsson, Magnus, et al., U.S. Appl. No. 17/543,962 entitled "Method to Produce a Veneered Element and a Veneered Element," filed Dec. 7, 2021.
International Search Report mailed Aug. 5, 2014 in PCT/DE2014/100106, Isa, European Patent Office, Rijswijk, NL, 3 pages.
Extended European Search Report issued in EP 19177864.6, Nov. 6, 2019, 9 pages, European Patent Office, Munich, DE.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
BTLSR Toledo, Inc. website. http://www.btlresins.com/more.html. "Advantages to Using Powdered Resins," May 26, 2007, 2 pages, per the Internet Archive WayBackMachine.
Fang, Chang-Hua, et al., "Densification of wood veneers by compression combined with heat and steam." *Eur. J. Wood Prod.*, 2012, pp. 155-163, vol. 70, Springer-Verlag, Germany (available online Feb. 1, 2011).

Floor Daily, "Shaw Laminates: Green by Design," Aug. 13, 2007, 1 pg, Dalton, GA.
Le Fur, X., et al., "Recycling melamine-impregnated paper waste as board adhesives," published online Oct. 26, 2004, pp. 419-423, vol. 62, Springer-Verlag, DE, XP055332791.
Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).
Mercene Labs, official home page, retrieved Feb. 23, 2017, 3 pages, retrieved from the Internet: http://www.mercenelabs.com/technology/, according to the Internet Archive WayBack Machine this page was available on Jan. 22, 2013.
Nimz, H.H., "Wood," Ullmann's Encyclopedia of Industrial Chemistry, published online Jun. 15, 2000, pp. 453-505, vol. 39, Wiley-VCH Verlag Gmbh & Co. KgaA, Weinheim, DE.
Odian, George, "Principles of Polymerization," 1991, $3^{rd}$ Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.
U.S. Appl. No. 17/232,687, Slottemo et al.
Slottemo, Andreas, et al., U.S. Appl. No. 17/232,687 entitled "Method for Producing a Building Element, a Pressing Device and a Method of Embossing a Wooden Surface," filed Apr. 16, 2021.
Ziegler, Göran, et al., U.S. Appl. No. 17/496,441 entitled "Method to Produce a Veneered Element and a Veneered Element," filed Oct. 7, 2021.
U.S. Appl. No. 17/769,594, Rickard Rittinge, filed Apr. 15, 2022.
U.S. Appl. No. 17/768,022, Rickard Rittinge, filed Apr. 11, 2022.
U.S. Appl. No. 17/038,567, Marcus Bergelin, filed Sep. 30, 2020.
U.S. Appl. No. 17/543,962, Magnus Nilsson, filed Dec. 7, 2021.
U.S. Appl. No. 17/697,417, Göran Ziegler, filed Mar. 17, 2022.
U.S. Appl. No. 17/711,487, Darko Pervan, filed Apr. 1, 2022.
U.S. Appl. No. 17/747,325, Göran Ziegler, filed May 18, 2022.
U.S. Appl. No. 18/047,755, Guido Schulte, filed Oct. 19, 2022.
U.S. Appl. No. 18/157,811, Anette Hedlund, filed Jan. 20, 2023.
U.S. Appl. No. 16/365,764, Christer Lundblad, filed Mar. 27, 2019.
U.S. Appl. No. 18/289,506, Göran Ziegler, filed Nov. 3, 2023.
U.S. Appl. No. 18/392,427, Göran Ziegler, filed Dec. 21, 2023.
U.S. Appl. No. 18/576,241, Rickard Rittinge, filed Jan. 3, 2024.
U.S. Appl. No. 18/576,294, Rickard Rittinge, filed Jan. 3, 2024.
Decision to grant a European patent received for European Application No. 14718504.5 mailed on Nov. 24, 2022, 2 pages.
Intention to grant received for European Application No. 14718504.5, mailed on Jun. 20, 2022, 6 pages.
International Preliminary Report on Patentability received for PCT Patent Application No. PCT/DE14/100106, mailed on Jun. 9, 2016, 15 pages.
Machine translation of description of JPH03211047 (A), 6 pages, Sep. 1991. (Year: 1991).
Office Action received for European Application No. 14718504.5, mailed on Mar. 3, 2020, 5 pages.
Office Action received for European Application No. 14718504.5, mailed on May 3, 2017, 6 pages.
Office Action received for European Application No. 14718504.5, mailed on Nov. 13, 2020, 4 pages.

* cited by examiner

FLOOR, WALL, OR CEILING PANEL AND METHOD FOR PRODUCING SAME

CROSS REFERENCE TO RELATED APPLICATIONS

The present application is a continuation of U.S. application Ser. No. 16/571,547, filed on Sep. 16, 2019, which is a continuation of U.S. application Ser. No. 15/039,638, filed on May 26, 2016, now U.S. Pat. No. 10,442,164, which is a U.S. national stage of International Application No. PCT/DE2014/100106, filed on Mar. 27, 2014, which claims the benefit of German Application No. 10 2013 113 125.5, filed on Nov. 27, 2013. The entire contents of each of U.S. application Ser. No. 16/571,547, U.S. application Ser. No. 15/039,638, International Application No. PCT2014/100106, and German Application No. 10 2013 113 125.5 are hereby incorporated herein by reference in their entirety.

TECHNICAL FIELD

The invention relates to a floor, wall, or ceiling panel, which has a carrier plate and a topside veneer, and a method for the production of such a floor, wall, or ceiling panel.

Panels with a top or cover layer of real wood are particular used as real wood floors or parquet floors. Such floors provide a natural living atmosphere. They feel pleasantly warm underfoot and compensate humidity fluctuations in the room air, which contributes to a healthy room atmosphere. Also very popular are floor boards with a top or cover layer made of cork or a cork veneer.

A method for producing parquet or veneer floorboards with a top layer of real wood is described in DE 102 45 914 A1. In this reference a top layer of real wood is impregnated with thermosetting synthetic resins. After impregnation the top later is glued to the carrier plate. The top layer is also printed.

Common are floor panels with a three-layer construction and profiled joining surfaces at the side borders for forming joining means in the form of groove and tongues or a so-called click system. The joining means enable a mechanical coupling of the individual panels with each other in a floor covering or a wall or ceiling covering. The carrier plate is usually made of wood material, in particular a highly compressed fiber plate (HDF). The topside cover layer of wood can have different thicknesses. In parquet floors the cover layer of wood has a thickness of more than 2.5 mm. According to a common terminology used in the art, veneers for cover layers of floor panels start about 0.4 mm. Generally floor panels with wood cover layers of smaller than 2.5 mm are referred to as real wood veneer floors.

After the gluing of the veneer flaws in the surface, for example branch holes or cracks, are smoothened. Usually an excess of smoothening compound is used and subsequently removed again. This is usually performed by grinding or brushing. In particular in the case of thin veneer layers this involves the risk that the subsequent mechanical processing may damage the layer. For this reason oftentimes veneers are used that are thicker to begin with or veneers that have flaws are sorted out beforehand. However, this is uneconomical and also diminishes the variability of the optical appearance of the natural wood floors.

Also known is a so-called real wood laminate. In this case an overlay is applied to the cover layer made of veneer for example in the form of a melamine paper or melamine film. Subsequently this sandwich is then pressed. A disadvantage is that the flaws naturally occurring in this product, such as gaps, cracks, branches or pores oftentimes appear milky. The cause for this is the missing or insufficient pressing pressure during the pressing process because in the region of the flaws the counter pressure is absent. On the other hand when a higher pressure is applied, the texture of the press plate dominates the wood surface and the natural wood texture or optic suffers.

SUMMARY

In light of the state of the art the invention is based on the object to provide a floor, wall, or ceiling panel which can be manufactured cost-effectively and has a high quality and an improved natural optic, and a method for producing such a floor-, wall- or ceiling-panel.

The part of the object relating to the device is solved with a floor-, wall- or ceiling panel which has a carrier plate and a topside veneer, characterized in that between the carrier plate and the veneer a resin layer is provided and the carrier plate, the resin layer and the veneer are pressed together. The part of the object relating to the method is solved with a method for producing a floor wall or ceiling panel, which has a carrier plate and a topside veneer, characterized by the following steps: providing a large area basic carrier plate; providing a veneer; forming a multilayer body comprising the basic carrier plate, the veneer and a resin layer interposed between the basic carrier plate and the veneer and a balancing layer arranged on a bottom side of the basic carrier plate; joining the basic carrier plate, the resin layer and the veneer and the balancing layer by pressing the multilayer body in a press, wherein the pressing pressure the pressing temperature and the pressing time are adjusted so that during a pressing of the multilayer body pores, cracks and/or gaps in the veneer are filled with resin; subsequently the pressed multilayer body is separated into individual panels and the panels are profiled at their side borders and are provided with joining means.

Advantageous embodiments, refinements and aspects of the invention are disclosed throughout.

DETAILED DESCRIPTION

Figure 1:
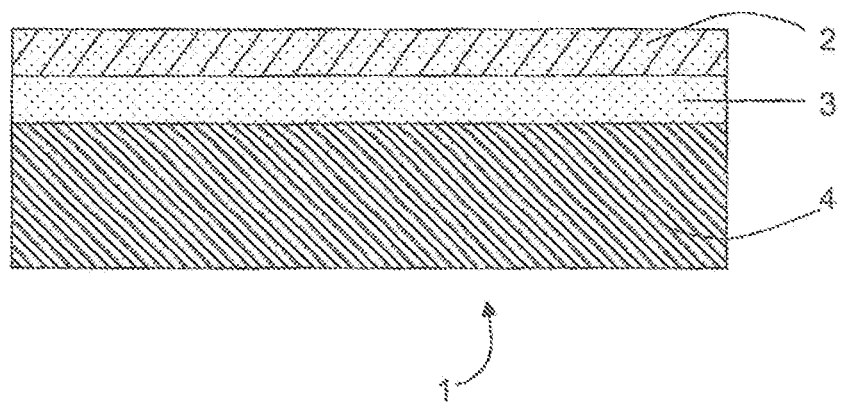
FIG. 1 shows a cross sectional view of a panel according to an embodiment of the invention.

The present invention relates in particular to real wood or veneer floor panels with a veneer made of wood and a thickness of the veneer of smaller than 2.5 mm, in particular with a thickness between 0.6 mm and 1.2 mm. The veneer can also be a cork veneer, in particular an oak cork veneer.

The carrier plate is a plate material made of a wood material, such as for example solid wood, chipboard, wood fiber material, MDF (Medium Density Fiber Board) or HDF (High Density Fiber Board). Within the scope of the invention preferably a carrier plate made of HDF is used. The starting product in the production of floor-, wall- or ceiling panels according to the invention is a large-area carrier plate, in the present case also referred to as basic carrier plate. Such a large-area carrier plate is configured rectangular and has a size of 2,000 mm to 5,000 mm in length and 1,200 mm to 2,100 mm in width. Usually the carrier plate or the basic carrier plate has a thickness of 5 mm to 12 mm. Also conceivable are waterproof materials for example based on mineral materials such as fiber-cement, sand-binding-mixtures or wood-plastic-composite materials (wood-plastic-composites WPC) and wood fiber polymer composite materials or also the use of magnesite plates. According to one aspect natural-fiber-reinforced plastic is used as work material for the carrier plate or the basic carrier plate. Beside wood fibers also other plant fibers such as jute or flax can be used, in particular in a wood fiber or wood powder proportion of 50% to 90% and a plastic matrix of polypropylene (PP). Further a wood-plastic-composite based on thermoplastically processible thermoplasts, such as modified melamine resin with a natural fiber or natural powder proportion can be used. In this connection also bamboo-plastic-composites (BPC) offers interesting practical approaches. In this material bamboo fibers or bamboo powder are used as natural material.

As mentioned above, also plates based on cement-containing binders or fiber cement plates can be used as carrier plate; also magnesite plates. Magnesite plates are made of a mixture of magnesium oxide, calcium carbonate, silicates and fibers, in particular wood and/or glass fibers. An advantage of magnesite plates is the low weight and the low heat conductivity as wells as their flame resistance. Magnesite plates are categorized as non-flammable.

The core of the invention is that between the carrier plate and the veneer a resin layer is provided and the carrier plate, the resin layer and the veneer are pressed with each other and are joined with each other. The resin of the resin layer permeates or impregnates the veneer. The pressing is performed hot at a temperature, which essentially depends on the resin material.

Preferably the pressing is performed at a temperature of more than 100° C., preferably at a temperature of between 100° C. and 140° C. The pressing temperature relates to the temperature at the press plate of the pressing tool. This temperature is also present at the contact surfaces of the pressing plate with the topside of the veneer or the bottom side of the carrier plate. In the case of thermosetting resins or reactive resins higher temperatures are required. In particular the pressing is performed at a temperature between 180° C. and 210° C.

In the case of resins in the form of urea-formaldehyde-condensation products the pressing temperatures are lower, in particular in a range between 100° C. and 140° C. In these resin materials also temperatures of 80° C. may be sufficient.

The resin layer is made of a resin. The resin is in particular a polyvinyl acetate (short PVAc) i.e., a thermoplastic plastic. Particularly preferably the resin layer is a polymer resin, in particular a urea-formaldehyde-condensation product as it is sold by the company BASF under the trade name and registered trademark "KAURIT". Preferably a pulverous melt-formed urea-formaldehyde-condensation product is used. The resin of the resin layer can also be a thermosetting synthetic resin. Colored or transparent resins or colored urea resins, colored urea-melamine or colored melamine-polyurethane mixtures or colored polymer resins can be used. According to an aspect of the invention resins are used that cure and react under the influence of heat. In this connection the use of aminoplastic polyurethane or reactive resins such as polyurethane (PUR) or thermoplastic polyurethane is advantageous. The resin or the resin layer is preferably present or configured as resin film.

An important aspect of the invention is the use of Kaurit resins, in particular Kaurit glues. Particularly appropriate are Kaurit powder glues, which are mixed with water and hardener. This leads to a particularly effective penetration of the pores in the veneer. The resin ensures a good penetration into the veneer layer. In this connection a coloring of the Kaurit glue, for example with black or brown dies is advantageous in order to make the otherwise invisible Kaurit glue visible. For optimization purposes fillers are added to the resin mixture for example in the form of wood fibers, wood chips, cellulose fibers, cork powders, stone powders and other or similar natural fillers.

The resin layer can be applied as powder or as a liquid, in particular a highly pasty film. For application on the basic plate a watery resin solution is produced. An advantageous mixture ratio consists of two weight parts of resin powder and one weight part of water.

Preferably the resin layer is colored, in particular black or brown. This is accomplished in particular by adding color or dyeing agents, for example color pigments to the resin powder.

A further optimization of resin mixtures is accomplished by adding fillers, in particular wood fibers, woodchips, cellulose fibers, cork powder or stone powders and the like, in particular natural additives, For producing a floor-, wall- or ceiling panel according to the invention a large-area or large dimension basic carrier plate and a veneer are produced in plate shape in the desired size. Hereby the veneers are placed on as strips or as composite (glued or stitched) veneer or as a broad rotary-cut veneer that is adapted to the format of the basic carrier plate. A multilayer body is formed including the basic carrier plate and the veneer. Between the basic plate and the veneer a resin layer is interposed. On the bottom side of the carrier plate a balancing layer is arranged. The thusly formed multilayer body is then pressed in a pressing tool so that the basic carrier plate, the resin layer, the veneer and the balancing layer are joined. The pressing of the multilayer body is carried out in a pressing tool, i.e., at a pressing pressure adjusted to the product.

When using a resin layer of amino plastic, thermosetting or reactive resins such as polyurethane (PUR) or thermoplastic polyurethane, a pressing pressure of greater than or equal to ($\geq$) 1000 Kilopascal (kPA) is regarded appropriate. Preferably the pressing pressure is above 3500 Kilopascal (kPa). The pressing temperature is hereby greater than or equal to ($\geq$) 120° C. preferably the pressing temperature is between 180° C. and 120° C. when the resin layer is made of a polymer resin, in particular a urea formaldehyde condensation product, the pressing is carried out at a pressing pressure of greater than or equal to ($\geq$) 100 Kilopascal (kPa). The pressing is hereby carried out at a pressing temperature which is preferably between 100° C. and 140° C.

The pressing temperature relates to the temperature at the press plate of the pressing tool. Within the framework of the method according to the invention the pressing time during which the multilayer body is impinged in the pressing tool with pressure is between 10 seconds and 60 seconds. In the case of resin layers based on polymer resins the pressing time is preferably between 20 seconds and 25 seconds.

During the pressing process the surface of the veneers may be provided with a texture, a pattern or ornaments by a texturizing plate or a texturizer. The glossiness of the texture can vary in sub-regions. Further different texture depths are possible. The depth of the texture can be up to 0.6 mm. Relative to the veneer thickness the texture can have a depth of $\frac{2}{3}$ of the veneer thickness.

After the pressing process the pressed multilayer body is separated into individual panels. In a subsequent work step the individual panels are then profiled at their side borders. The profiling is carried out only after the carrier plate has cooled to room temperature. The profiling serves in particular for forming joining means at the longitudinal and transverse sides.

The division of the pressed multilayer body is performed after cooling. For this the multilayer body can be passed over a cooling path or can be intermediately stored for cooling.

As pressing tool in particular a short-contact press is used or a continuous press. During the hot pressing process or the pressing process under the influence of temperature the resin layer is plasticized and penetrates into the veneer. An important aspect of the invention is that the resin of the resin layer permeates the veneer up to the topside of the veneer. Hereby pores, cracks, gaps and/or other flaws in the veneer are filled with resin during the pressing process. The resin of the resin layer forms an inseparable connection between the veneer and the carrier plate. A particular advantage of the invention is thus that two production steps, i.e., gluing and smoothening of the veneer are performed in one step.

In particular the pressing of the multilayer body is performed so that the resin permeates the veneer and after the pressing the resin is visible at the surface of the veneer. In this connection in particular resins whose color is coordinated with the color of the veneer are used. In terms of production a black resin is regarded as universally advantageous. Suitably the pressing is performed so that only very little or no resin at all sticks to the surface of the veneer. Pores, cracks, gaps or other flaws are visibly filled. However, no or only very little excess resin exits on the surface. The pressed product then only has to be texture brushed and may be provided with a surface oil treatment or varnishing.

An alternative provides that the resin layer is formed by a resin film that is applied on the topside of the carrier plate. Hereby the resin is applied to the carrier plate in liquid form and is partially dried or pre-condensed. The resin film adheres to the carrier plate as a gel or wax-like layer.

The resin layer can also be formed on the bottom side of the veneers in the form of a resin film. Also in this case the resin is applied in liquid form on a side of the veneers. As a result the veneers are impregnated with resin. The resin applied in liquid form is partially dried and pre-condensed. The thus impregnated veneer provided with the resin layer is further processed after producing the resin layer. Prior to forming the multilayer body, the veneers are rotated so that the resin layer is on the bottom side of the veneers and comes into contact with the topside of the starting carrier plate.

A resin film can also be formed by applying resin in powder form onto the surface of the starting carrier plate or onto the veneers. The pulverous resin is then melted under heat influence so that the resin film forms.

Generally the resin can also be present or processed paste-like, i.e., in the form of a paste.

The amount of resin is dosed so that it infiltrates or permeates through the veneer, however it cannot exit onto the surface of the veneer as a result of the closed press. Pores flaws, cracks or gaps in the veneer are pressed with resin and filled. The natural wood surface or cork surface and structure remains preserved. The resin can be thickened with a filler. As a result more mass is present in order to fill pores cracks gaps and/or flaws. As filler organic or inorganic materials can be used, in particular mineral pigments, stone powder or chalk, as well as wood powder or wood powder.

The balancing layer compensates tensions in the multilayer body. The balancing layer can be a veneer, a paper, a foil or a film in particular a plastic resin film. Advantageously a balancing veneer or a balancing paper is also provided with resin or impregnated with plastic resin. The balancing layer is pressed during production of the floor, wall, or ceiling panel according to the invention together with the basic carrier plate, the veneer and the resin layer and connected on the bottom side with the basic carrier plate.

The panels are profiled at their side borders and provided with joining means. Joining means can be configured as groove and tongues. Preferably the side borders are provided with a click joint. The panels can also be provided with a circumferential chamfer at their topside borders. In the case of a panel with chamfer the intermediate resin layer has a very positive effect on the humidity sealing in the installed product.

A color design of the panels is also possible when the resin remains visible at the side borders. In particular this is accomplished by a colored resin, which is color coordinated with the veneer. Hereby individual or all side borders can be configured with a visible border strip of resin. A different visual appearance of a panel results when using a resin whose color contrasts that of the veneer. This for example allows generating a specific visual appearance of the joint in a targeted manner. The interplay between resin and veneer enables visually accentuating the surface of a floor-, wall- or ceiling panel according to the invention. For this purpose also effect material in the resin such as pigments and other fillers for example glimmer can be used.

A further aspect is to form the chamfer as a decorative optically delimiting edge. The veneer can also be printed with a decor. Preferably the printing is performed by means of digital printing. Hereby a system of printing inks is used that is adapted to the used resins. It is possible to apply a sealing to the veneer. The term sealing means the application of color, a pickle or an oil or a varnish or varnish system.

It is particularly advantageous that the panel or the surface of the veneer can be subjected to a mechanical processing after the pressing. A surface treatment includes in particular a grinding or a brushing of the surface. This allows accentuating the natural visual appearance of the surface. By unevenly treating the surface an aged texture or look, a so-called vintage effect, can be achieved. The surface of the boards can thus for example have a rough-sewn surface or chatter marks or grinding flaws or the like.

A further aspect of the invention provides that during the pressing a texture is embossed into the veneer, in particular into the surface of the veneer. This also contributes to the particularly elegant and decorative surface. The embossing process also advantageously supports the penetration of the resin material into the veneer.

A floor-, wall- or ceiling panel according to the invention can be cost-effectively produced and is of high quality. The panels are compelling in their natural wood optic or cork optic with a rustic character due to the optically perceptible filled cracks, gaps and/or branch holes. Because the veneer, i.e., the topside wear surface or cover layer of the panel is permeated or impregnated with resin, in addition the resistance, in particular the impact resistance and the wear resistance, is increased. The increased resistance enables mechanical processing of the veneer for example by grinding or brushing with a lower risk that the optic is destroyed by the mechanical processing. The boards are significantly more durable. The invention advantageously enables also using softer woods or veneers made of softer woods such as larch. As a result of the resin impregnation or permeation a veneer made of a soft wood becomes harder and more durable.

Within the framework of the invention also advantageously vapored or smoked veneers can be used. Particularly suited are further veneers made of coarse pored woods such as oak, ash larch or spruce as well as veneers made of cork. The quality of the veneers is improved and the veneers are optically accentuated by the resin infiltration according to the invention.

FIG. 1 shows a cross section view of a panel 1 according to an embodiment of the invention. The panel 1 includes a veneer 2, a resin layer 3, and a carrier plate 4.

Figure 2:
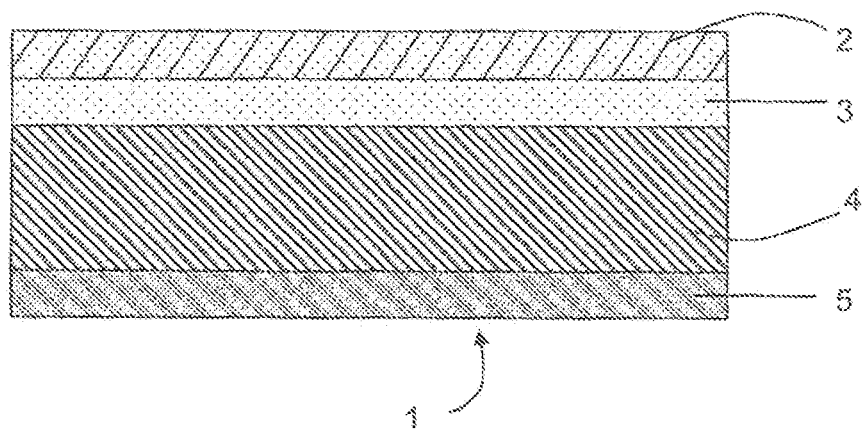
FIG. 2 shows a cross sectional view of a panel according to another embodiment of the invention.

FIG. 2 shows a cross section view of a panel 1 according to another embodiment of the invention. In this embodiment, the panel 1 further includes a balancing plate 5 arranged on the bottom side of carrier plate 4.

The invention claimed is:

1. A floor, wall, or ceiling panel, comprising:
a basic carrier plate, the basic carrier plate comprising a top surface and a bottom surface, a veneer, and a resin layer interposed between the top surface of the basic carrier plate and the veneer,
wherein the veneer is impregnated by resin from the resin layer,
the panel having been formed by pressing the basic carrier plate, the veneer, and the resin layer together at a pressing pressure greater than or equal to 1000 kPA,
wherein the veneer is natural wood,
wherein the veneer is a composite stitched from strips of natural wood.

2. The panel of claim 1, the panel having been formed by pressing the basic carrier plate, the veneer, and the resin layer together for a pressing time, wherein the pressing time is between 10 seconds and 60 seconds.

3. The panel of claim 1, further comprising joining means at side borders of the panel.

4. The panel of claim 1, wherein the veneer includes pores, cracks, and/or gaps prior to pressing.

5. The panel of claim 4, wherein the basic carrier plate, the veneer, and the resin layer are pressed together for a pressing time and pressing temperature, wherein the pressing pressure, the pressing temperature and the pressing time are adjusted so that during the pressing, the pores, the cracks, and/or the gaps in the veneer are filled with resin from the resin layer.

6. The panel of claim 1, further comprising a balancing layer arranged on the bottom surface of the basic carrier plate.

7. The panel of claim 1, wherein resin layer comprises filler.

8. The panel of claim 1, wherein the veneer is a soft wood veneer, wherein after pressing and impregnation of the veneer, the soft wood veneer becomes harder.

9. The panel of claim 1, the panel having been formed by pressing the basic carrier plate, the veneer, and the resin layer together in a press comprising a press plate, the press plate having been heated to a temperature of between 180° C. and 210° C. during the pressing in the press.

10. The panel of claim 1, wherein the resin layer contains a urea-formaldehyde-condensation product glue.

11. The panel of claim 10, wherein the urea-formaldehyde-condensation product glue is colored and optionally includes fillers chosen from wood fibers, wood chips, cellulose fibers, cork powders, stone powders and any combination thereof.

* * * * *